United States Patent [19]

Consales

[11] 4,400,885
[45] Aug. 30, 1983

[54] LOCKING SYSTEM FOR A REMOTE CENTER COMPLIANCE DEVICE

[75] Inventor: Emanuel J. Consales, Winchester, Mass.

[73] Assignee: The Charles Stark Draper Laboratory, Inc., Cambridge, Mass.

[21] Appl. No.: 281,659

[22] Filed: Jul. 9, 1981

[51] Int. Cl.³ .............................................. G01B 5/25
[52] U.S. Cl. ................................ 33/185 R; 33/169 C
[58] Field of Search ............ 33/169 C, 172 D, 185 R, 33/189; 248/603, 604, 605, 614

[56] References Cited

U.S. PATENT DOCUMENTS

| | | | |
|---|---|---|---|
| 4,098,001 | 7/1978 | Watson | 33/169 C |
| 4,155,169 | 5/1979 | Drake et al. | 33/169 C |
| 4,202,107 | 5/1980 | Watson | 33/169 C |
| 4,283,153 | 8/1981 | Brendamour | 33/185 R |
| 4,337,579 | 7/1982 | De Fazio | 33/169 C |
| 4,355,469 | 10/1982 | Nevins et al. | 33/185 R |

Primary Examiner—Richard R. Stearns
Attorney, Agent, or Firm—Joseph S. Iandiorio

[57] ABSTRACT

A lockable remote center compliance (RCC) device is provided including: a deformable support structure and an operator member having a first section attached to the support structure and a second section incorporating the free end of the operator member. A frame proximate the free end of the operator member supports the support structure. Locking is accomplished by first and second parts carried one by the operator member and the other by the frame, for releasably securing the operator member to the frame. The operator member sections are moved relative to one another to engage the first part with the second part to secure the free end of the operator member against compliant action.

11 Claims, 5 Drawing Figures

LOCKING SYSTEM FOR A REMOTE CENTER COMPLIANCE DEVICE

FIELD OF INVENTION

This invention relates to a locking system for a remote center compliance device.

BACKGROUND OF INVENTION

A remote center compliance (RCC) device provides a remote center of compliance at, near or beyond the free end of an operator means or member. The operator member with the remote center near its tip may perform or carry parts that perform various functions, e.g. docking, tooling, insertion, engaging.

The remote center of compliance is a point about which rotation of the operator member occurs and with respect to which translation of the operator member occurs. RCC devices have five degrees of freedom, rotation about the axis of the operator member, and rotation and translation along two mutually perpendicular axes orthogonal to the axis of the operator member.

RCC devices often carry at the free end of the operator member tools or other apparatus which may be quite heavy. If oriented horizontally, the weight at the free end of the operator member may cause the free end of the operator member to droop and rest on the support frame. In any orientation, the compliant structure of the RCC, especially with added weight, is highly susceptible to vibration and oscillation as it is moved about from one position to another. The oscillation or vibration not only makes it difficult to initiate the next task, but may become large enough to damage the RCC or other equipment.

One attempt to prevent these problems employs a control unit including a cylinder and piston which could be pneumatically driven to clamp the piston on to a conical jamming collet on the RCC and make rigid the RCC with its support frame. The control circuit is large, bulky and relatively heavy and requires substantial pressure and flow to operate. Further, it does not prevent the drooping of the free end or tip of the operator member, as the control unit only holds the body of the RCC device, not the tip of the operator member.

SUMMARY OF INVENTION

It is therefore an object of this invention to provide an improved, simple, yet highly effective locking system for an RCC device.

It is a further object of this invention to provide such a system which is relatively small, compact and lightweight.

It is a further object of this invention to provide such a system which is contained within the normal confines of an RCC device.

It is a further object of this invention to provide such a system which prevents drooping of the operator member in any orientation.

It is a further object of this invention to provide such a system which prevents vibration and oscillation of the operator member.

It is a further object of this invention to provide such a system which automatically exits the locking mode quickly and easily upon engagement of the operator member.

It is a further object of this invention to provide such a system which exits the locking mode at predetermined fixed or variable loading of the operator member.

This invention features a locking system for an RCC device including an operator member having a first section attached to the RCC device and a second section incorporating the free end of the operator member. There are means for supporting the RCC device, including frame means proximate the free end of the operator member. Locking means including first and second parts carried one by the operator member and the other by the frame means, releasably secure the operator member to the frame means. There are means for moving the sections relative to one another to engage the first part of the locking means with the second part of the locking means to secure the free end of the operator member against compliant action. In preferred embodiments, one of the sections includes a hole and the other a slide member slidable in the hole. The means for moving may include spring means, which may either urge the slide member out of the hole or urge the slide member into the hole. The means for moving may also include means for applying fluid pressure to the slide member in the hole.

The first part of the locking means may include a plurality of locking pins and the second part a plurality of locking holes for receiving the pins, and the pins may be tapered to a smaller width at their ends which engage the locking holes to initiate unlocking as soon as the parts begin to move apart, and to facilitate re-engagement of the parts. There may also be included anti-rotation means for limiting rotation of the operator member relative to the frame means. The anti-rotation means may have first and second parts mounted one on the operator member and the other on the frame means. The first parts may include a plurality of anti-rotation pins and the second part a plurality of anti-rotation holes, for loosely receiving the anti-rotation pins.

DISCLOSURE OF PREFERRED EMBODIMENT

Other objects, features and advantages will occur from the following description of a preferred embodiment and the accompanying drawings, in which.

Figure 1:
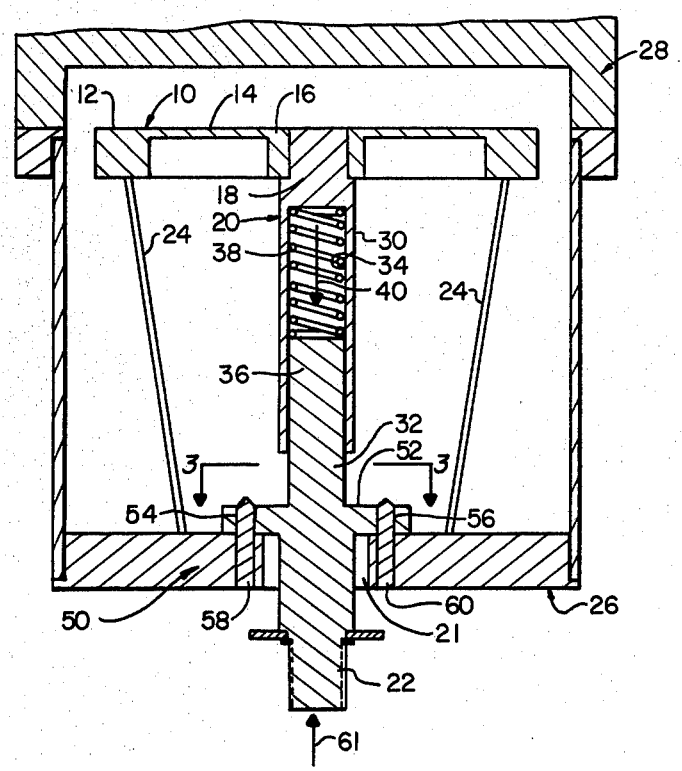
FIG. 1 is a schematic cross-sectional view of an RCC device with a locking system according to this invention.

Remote center compliance (RCC) devices establish a center of compliance, that is a point in space about which rotation motion, and with respect to which translational motion, may take place. The remote center may be within the RCC itself or its operator member, or parts held by the operator member, or external to it. A first type of RCC is disclosed in U.S. Pat. No. 4,098,001, Remote Center Compliance System, Paul C. Watson, July 4, 1978. A second type of RCC is disclosed in U.S. Pat. No. 4,155,169, Compliant Assembly System Device, Drake et al., May 22, 1979. A third type of RCC device is disclosed in U.S. patent application Ser. No. 140,768, now U.S. Pat. No. 4,337,579 filed Apr. 16, 1980, Deformable Remote Center Compliance Device, Thomas L. De Fazio. All three disclosures are incorporated here by reference.

In the first type of RCC device, the location of the remote center is determined by the geometry of a plurality of radially disposed members whose focus is a point in space at which the remote center of compliance is located. In the other types of RCC devices the remote center is determined by the geometry and stiffness of the radial members as well as the mechanical stiffness of other deformable elements, which may include the support, or operator, member.

The locking system of this invention may be used with any of the above types of RCC devices. The invention may be accomplished with a locking system for an RCC device which includes an operator member having a first section attached to the RCC and a second section incorporating the free end of the operator member. Typically, the first section attached to the RCC contains a cylindrical hole and the second section includes a piston or stem which slidably moves in the cylinder. The free end of the piston or rod constitutes the free end of the operator member. There are means for supporting the RCC device and attaching it to a robot or other mobility means. At least a portion of the support means or frame is proximate the free end of the operator member, and there are locking means, carried one part by the operator member and the other part by the frame, for releasably securing the operator member in the area proximate its free end to the frame means. For example, there may be pins mounted in the frame and a flange with holes for receiving those pins mounted on or near the free end of the operator member, for example the piston or stem portion. Spring, fluid pressure or other means hold the piston down so that the holes engage the pins and the RCC device is not compliant. As the tip of the operator member comes in contact with the workpiece and the contact force increases, it eventually overcomes the force of the spring or fluid pressure and lifts the holes off the pins so that the RCC device is now fully compliant. The pins may be tapered so that compliance begins to return just as soon as the holes begin to lift off the pins. The taper also facilitates the reseating of the holes on the pins. Alternatively, the pins could be on the operator member and the holes on the frame. Also, the positions of the piston and cylinder may be switched so that the cylinder is carried by the free end of the operator member and the piston or stem by the portion carried by the RCC body.

There is shown in FIG. 1 an RCC device 10 of the second type referred to above. It includes outer support member 12, which is interconnected by deformable portion 14 with inner support member 16 that carries one end 18 of operator member 20. The other end 22 of operator member 20 is free. Three radial support members 24, only two of which are shown, interconnect support member 12 with support means, including frame 26, which is adapted to be carried by a robot or other mobility device 28.

Operator member 20 includes two parts, upper part 30, whose end 18 is attached to support member 16, and lower portion 32, which slidably engages with part 30 and contains operator member free end 22, which passes through hole 21 in frame 26. Part 30 includes a cylinder 34 which slidably receives stem or piston 36 of part 32. Some means, such as spring 38, is provided to urge piston 36 out of cylinder 34 in the direction indicated by arrow 40.

Locking means 50 secures the lower, free end 22 of operator member 20 to frame 26 to prevent freedom of motion and compliance of RCC device 10. Locking means 50 includes flange 52 with holes 54 and 56 that receive locking pins 58 and 60 in the locking position depicted in FIG. 1. In operation, as the free end of operator member 20 contacts a mating piece the force 61 increases until it is sufficient to overcome the force 40 of spring 38 sufficiently so that flange 52 rises and holes 54 and 56 completely clear pins 58 and 60 so that RCC device 10 can operate fully compliantly. When the RCC device is disengaged, spring force 40 once again overcomes opposition and reseats holes 54 and 56 on pins 58 and 60 and is locked to prevent the drooping of free end 22 and other unwanted motions of RCC device 10.

Figure 2:
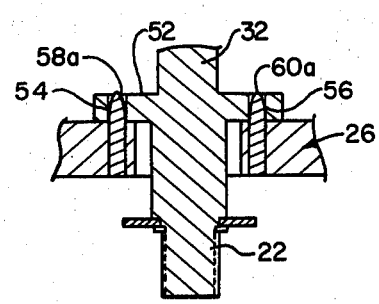
FIG. 2 is a view of a portion of the RCC device of FIG. 1 showing alternative locking means.

Locking pins may be made tapered, 58a, 60a, FIG. 2, in order that the RCC device 10 immediately begins to return to a compliant state as the locking flange 52 begins to move upwardly even before holes 54, 56 clear pins 58a and 60a. The taper also facilitates the reseating of holes 54, 56 under force 40 of spring 38.

Figure 3:
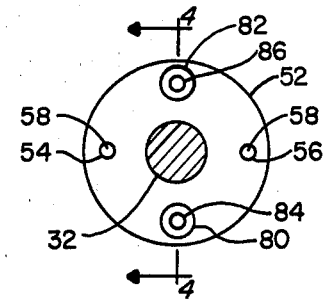
FIG. 3 is a plan view taken along lines 3—3 of FIG. 1, showing the locking means in greater detail.
Figure 4:
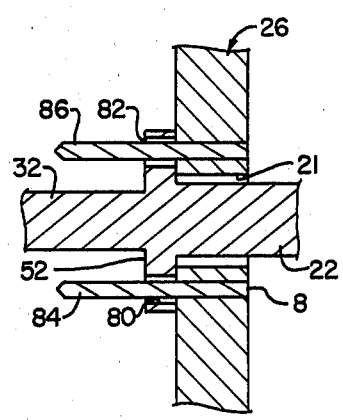
FIG. 4 is a cross-sectional elevational view of a portion of the RCC device of FIG. 1 taken along lines 4—4 of FIG. 3, illustrating the anti-rotational means in greater detail.

An anti-rotational device is provided by means of holes 80, 82, FIGS. 3 and 4, which are larger than pins 84, 86 which they slidably receive. Pins 84,86 are sufficiently longer than the axial distance traveled by part 32 of operator member 20, so that even when RCC device 10 is unlocked and fully compliant, holes 80, 82 never clear the free ends of pins 84, 86, and thus the clearance between holes 80, 82, and their respective pins 84, 86, provide a limit on the rotational motion that can be imparted to operator member 20. Even when flange 52 has risen sufficiently so that holes 54, 56 are clear of pins 58,60, holes 80 and 82 are not clear of pins 84 and 86.

Figure 5:
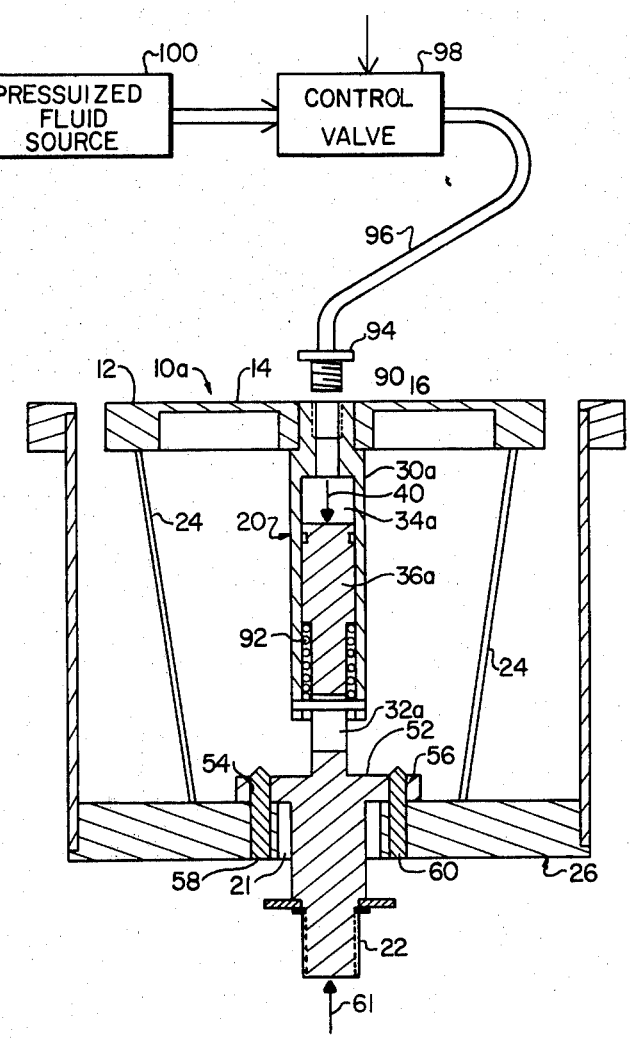
FIG. 5 is a schematic elevational cross-sectional view of an RCC device similar to that shown in FIG. 1 with a fluid drive.

Although the locking force 40 is shown thus far as provided by a spring, this is not a necessary limitation of the invention. For example, as shown in FIG. 5, the means for moving the sections relative to one another and applying locking force 40 may be provided for by introducing pressurized fluid into cylinder 34a through inlet 90, FIG. 5, to drive piston 36a downwardly and lock holes 54, 56 in flange 52 with pins 58, 60 on frame 26. Pressure introduced through inlet 90 may be increased to lock free end 22 of operator member 20, or may be decreased so that return spring 92 operates to retract piston 36a, unlock free end 22 of operator member 20, and return RCC device 10a to its compliant state. The pressure applied through inlet 90 may be controlled so that force 40 is always sufficient to perform various functions. For example, force 40 may be maintained at a level at which device 10a is unlocked and compliant, yet still sufficient to offset substantial force 61 applied to the tip 22 of operator member 20.

Fluid pressure may be provided through nipple 94 in hose 96 from a control valve 98 which supervises application of pressurized fluid, for example air, from pressurized fluid source 100, which may be a pneumatic pressure source.

Other embodiments will occur to those skilled in the art and are within the following claims.

What is claimed is:

1. A lockable remote center compliance (RCC) device comprising:
  a deformable structure;
  an operator member having a first section attached to said deformable structure and a second section incorporating the free end of said operator member;

means for supporting said deformable structure including:

frame means proximate the free end of said operator member;

locking means including first and second parts carried one by said second section of said operator member and the other by said frame means for releasably securing said operator member to said frame means; and means for moving said sections relative to one another to engage said first part of said locking means with said second part to secure the free end of the operator member against compliant action.

2. The device of claim 1 in which one of said sections includes a hole and the other a slide member slidable in said hole.

3. The device of claim 2 in which said means for moving includes spring means which urges the slide member out of the hole.

4. The device of claim 2 in which said means for moving includes means for applying fluid pressure to said slide member in said hole.

5. The device of claim 4 in which said means for moving further includes spring means which urges said slide member into said hole against the force of said fluid pressure.

6. The device of claim 1 in which said means for moving includes spring means.

7. The device of claim 1 in which said first part includes a plurality of locking pins and said second part a plurality of locking holes for receiving said pins.

8. The device of claim 7 in which said locking pins are tapered to a smaller width at their ends which engage said locking holes.

9. The device of claim 7 in which said first part including said locking pins is carried by said frame means.

10. The device of claim 1 further including anti-rotation means for limiting rotation of said operator member relative to said frame means when said locking means are disengaged and having first and second components mounted one on said second section of said operator member, the other on said frame means.

11. The device of claim 10 in which said first component includes a plurality of anti-rotation pins and said second component includes a plurality of anti-rotation holes for loosely receiving said anti-rotation pins.

* * * * *